(12) United States Patent
Hong

(10) Patent No.: US 7,004,416 B1
(45) Date of Patent: Feb. 28, 2006

(54) FISHING SPINNING REEL

(76) Inventor: Eugene Hong, 11F-6, No. 333, Sec. 2, Hwa-Mei West Street, Taichung (TW)

( * ) Notice: Subject to any disclaimer, the term of this patent is extended or adjusted under 35 U.S.C. 154(b) by 0 days.

(21) Appl. No.: 11/005,693

(22) Filed: Dec. 7, 2004

(51) Int. Cl.
*A01K 89/01* (2006.01)

(52) U.S. Cl. .................................................. 242/311
(58) Field of Classification Search ........ 242/310–312, 242/314, 315; D22/140, 141
See application file for complete search history.

(56) References Cited

U.S. PATENT DOCUMENTS 6,102,317 A * 8/2000 Bernard et al. ............. 242/319
6,902,127 B1 * 6/2005 Nishikawa .................. 242/311
2003/0146324 A1 * 8/2003 Yeh ............................ 242/311
2004/0200917 A1 * 10/2004 Nishikawa .................. 242/311
2004/0232265 A1 * 11/2004 Morise ....................... 242/311

* cited by examiner

*Primary Examiner*—Emmanuel M. Marcelo
(74) *Attorney, Agent, or Firm*—Trop, Pruner & Hu, P.C.

(57) ABSTRACT

A fishing spinning reel includes a flat reel body, two side covers, and a driving unit. The reel body is made of metal, and has a plurality of mounting holes formed through the reel body. Each of the mounting holes has two open ends at two opposite sides of the reel body. The side covers are made of a plastic material, are disposed respectively on the opposite sides of the reel body, and are interconnected to clamp the reel body therebetween so as to define an accommodating space among the reel body and the side covers. The driving unit is disposed within the accommodating space.

5 Claims, 7 Drawing Sheets

FISHING SPINNING REEL

BACKGROUND OF THE INVENTION

1. Field of the Invention

This invention relates to a fishing reel, and more particularly to a fishing spinning reel.

2. Description of the Related Art

Referring to FIGS. 1 and 2, a conventional fishing spinning reel is shown to include a reel body 1, a rotor 2 disposed rotatably on the reel body 1, a driving unit 3 disposed within the reel body 1, and a rotary lever unit 4 disposed pivotally on the reel body 1 and connected to the driving unit 3. The rotary lever unit 4 can be actuated to drive the driving unit 3.

The reel body 1 includes a housing 11 made of metal, and a cover 12 made of a plastic material. The housing 11 has a base wall 112 that defines a space 111 for mounting the driving unit 3, and a pair of first and second positioning rods 113, 114 extending inwardly from the base wall 112. The first positioning rod 113 is formed with a threaded hole 1131. The second positioning rod 114 is formed with a recess 1141. The cover 12 has a base wall 121, a counterbore 122 formed through the base wall 121 and is aligned with the first positioning rod 113, and a projection 123 extending from the base wall 121 into the recess 1141 in the second positioning rod 114. A headed bolt 13 extends through the counterbore 122 in the cover 12, and engages the threaded hole 1131 in the first positioning rod 113 so as to interconnect the housing 11 and the cover 12 fixedly. Because the cover 12 is made of the plastic material, the weight of the conventional fishing spinning reel can be reduced. However, the volume ratio of the cover 12 to the reel body 11 is relative small, thereby resulting in limited reduction of the weight of the fishing spinning reel.

SUMMARY OF THE INVENTION

The object of this invention is to provide a lightweight fishing spinning reel.

According to this invention, a fishing spinning reel includes a flat reel body, two side covers, and a driving unit. The reel body is made of metal, and has a plurality of mounting holes formed through the reel body. Each of the mounting holes has two open ends at two opposite sides of the reel body. The side covers are made of a plastic material, are disposed respectively on the opposite sides of the reel body, and are interconnected to clamp the reel body therebetween so as to define an accommodating space among the reel body and the side covers. The driving unit is disposed within the accommodating space.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
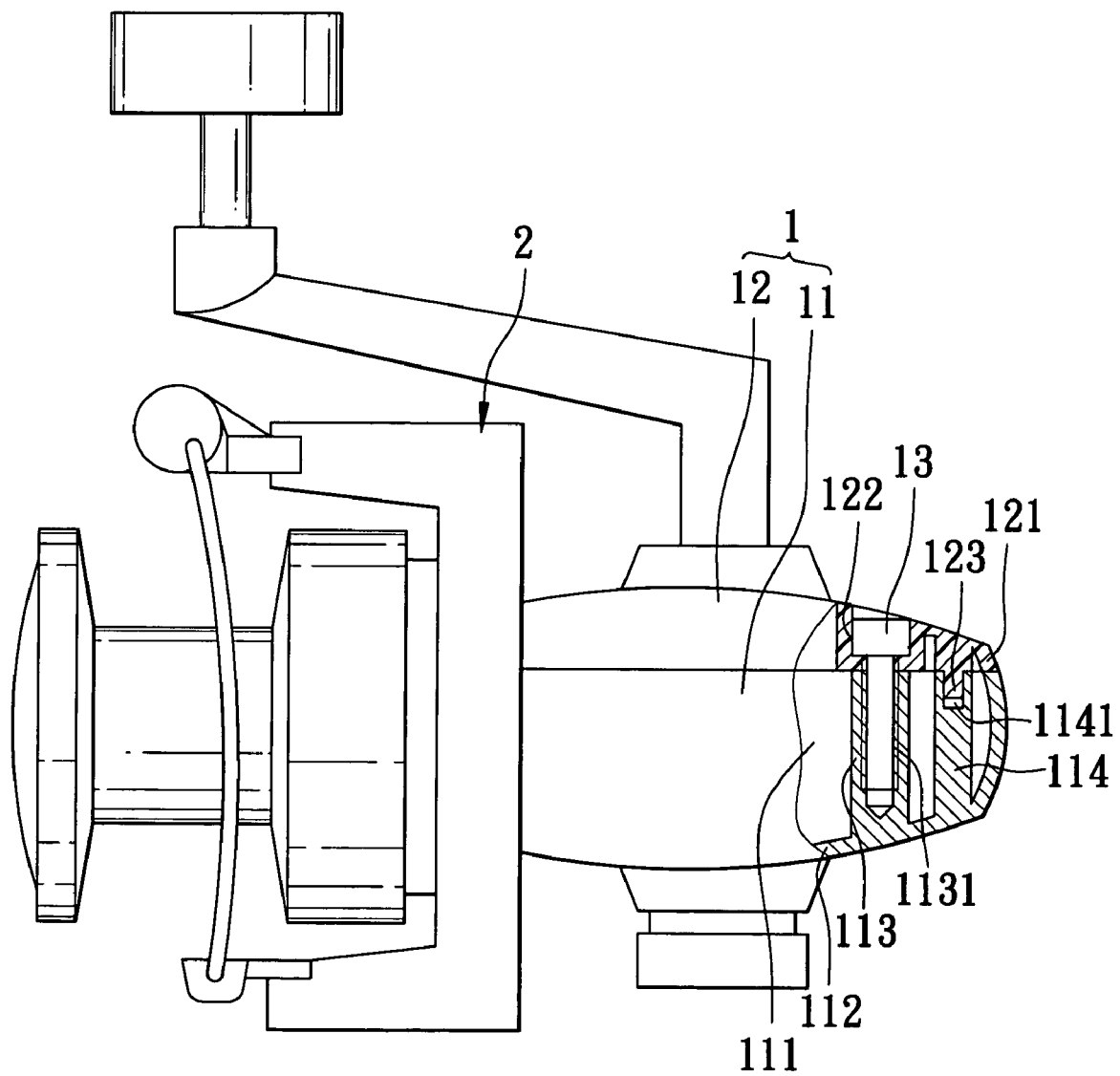
FIG. 1 is a partly sectional side view of a conventional fishing spinning reel.
Figure 2:
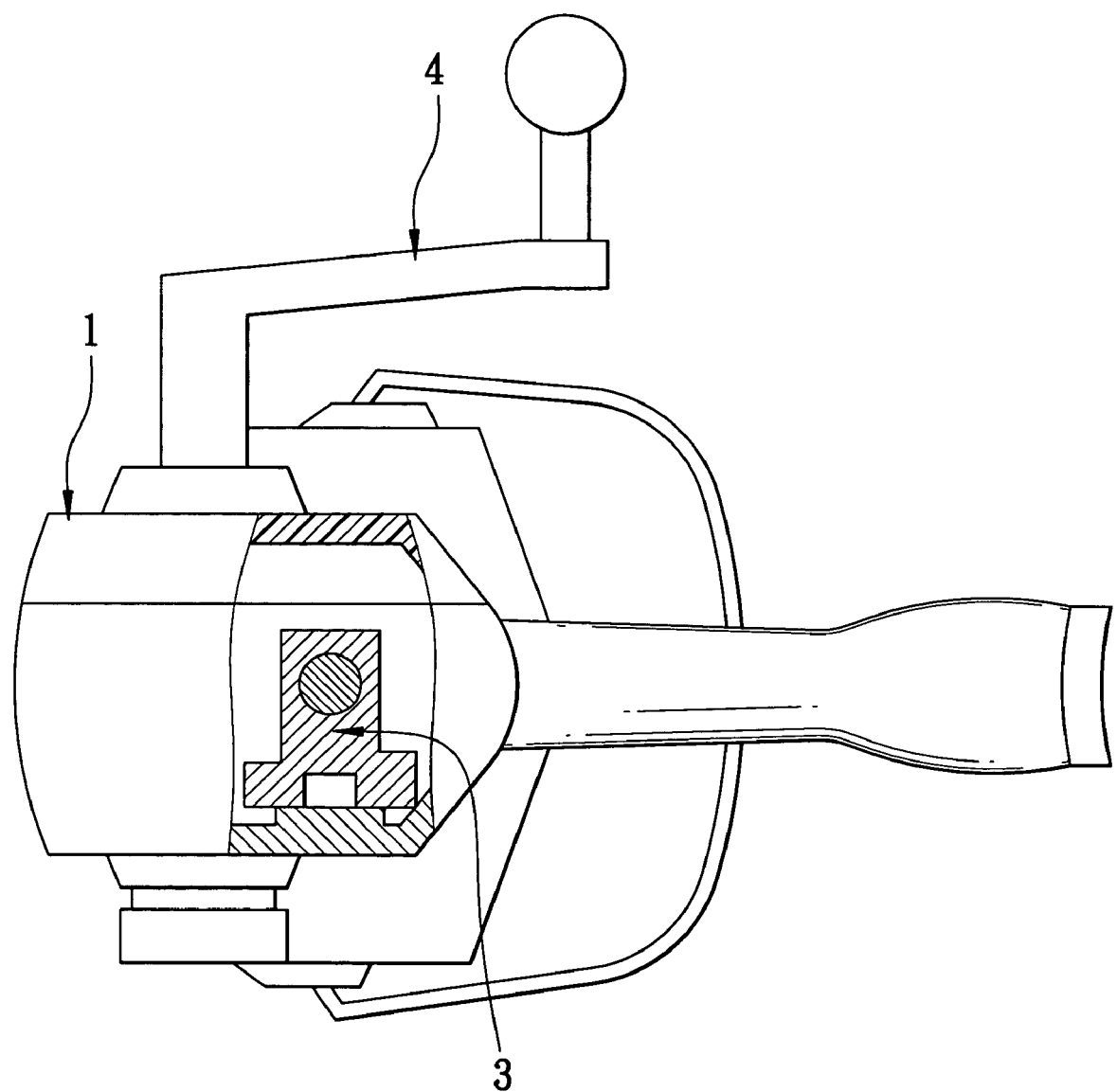
FIG. 2 is a partly sectional top view of the conventional fishing spinning reel.
Figure 3:
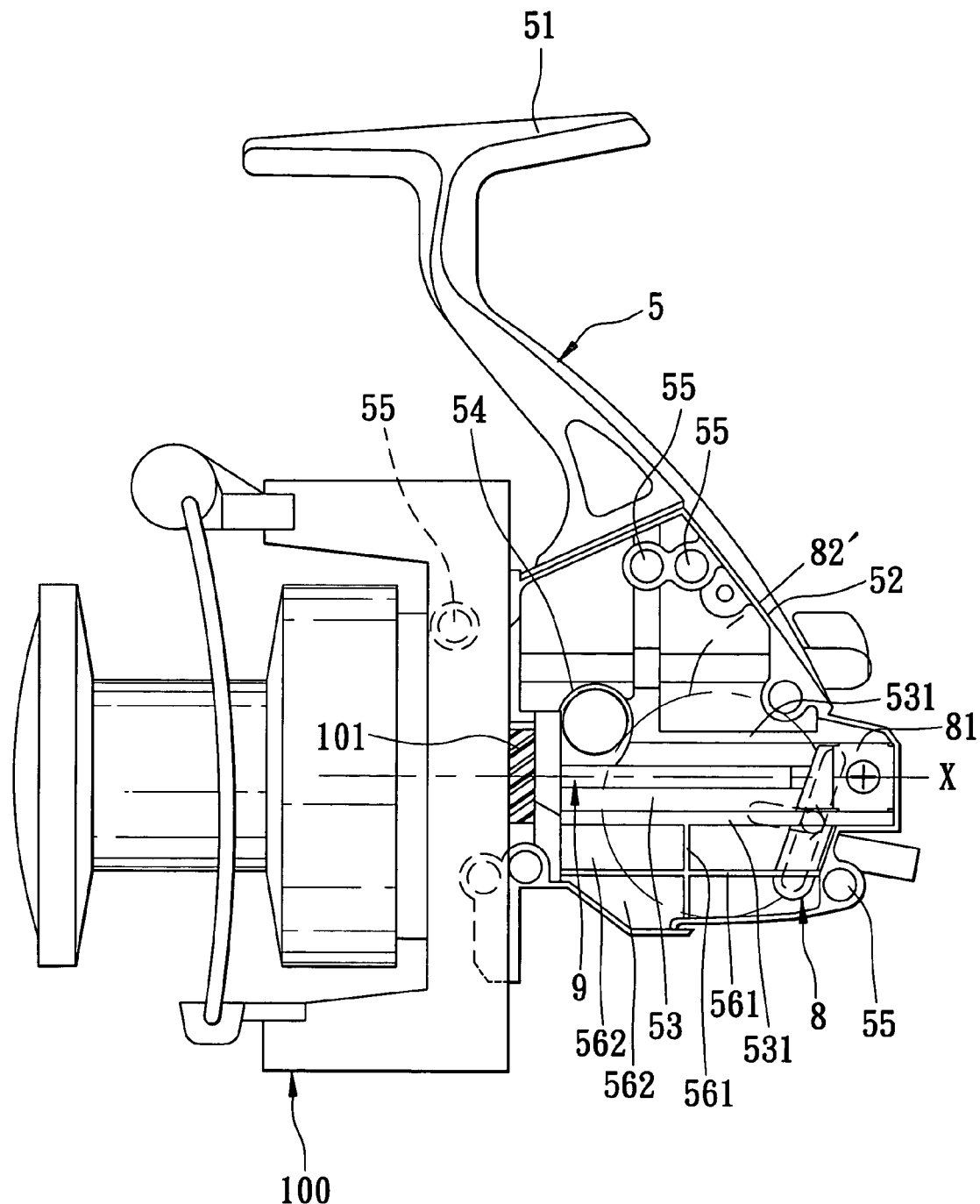
FIG. 3 is a side view of the preferred embodiment of a fishing spinning reel according to this invention, two side covers being removed to illustrate the structure of a reel body.
Figure 6:
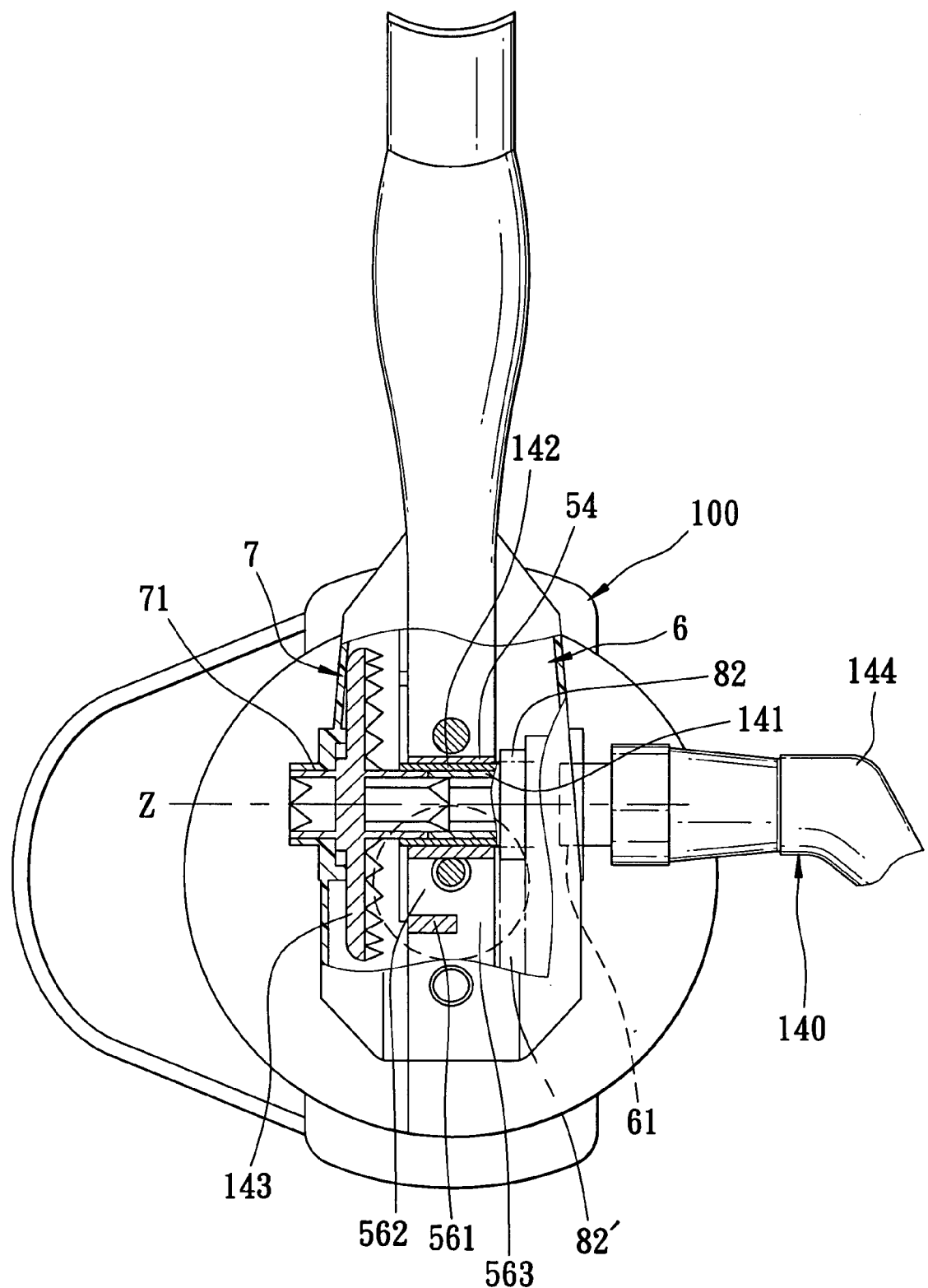
FIG. 6 is a fragmentary, partly sectional side view of the preferred embodiment, illustrating a rotary lever unit.

Referring to FIGS. 3 and 6, the preferred embodiment of a fishing spinning reel according to this invention is shown to include a flat reel body 5, a pair of first and second side covers 6, 7, a driving unit 8, a spool 9, a rotor 100, and a rotary lever unit 140.

The reel body 5 is made of metal, and has a fishing rod attaching portion 51, a peripheral frame portion 52 formed integrally with the fishing rod attaching portion 51, two parallel guide rods 531 extending integrally from the peripheral frame portion 53 so as to define a guide slot 53 therebetween extending along a first axis (X), a bearing hole 54 having a second axis (Z) perpendicular to the first axis (X), a plurality of positioning holes 55 disposed adjacent to the peripheral frame portion 52, and a plurality of intersecting reinforcing rods 561 defining a plurality of mounting holes 562 that are formed through the reel body 5. Each of the mounting holes 562 has two open ends at two opposite sides of the reel body 5.

Figure 4:
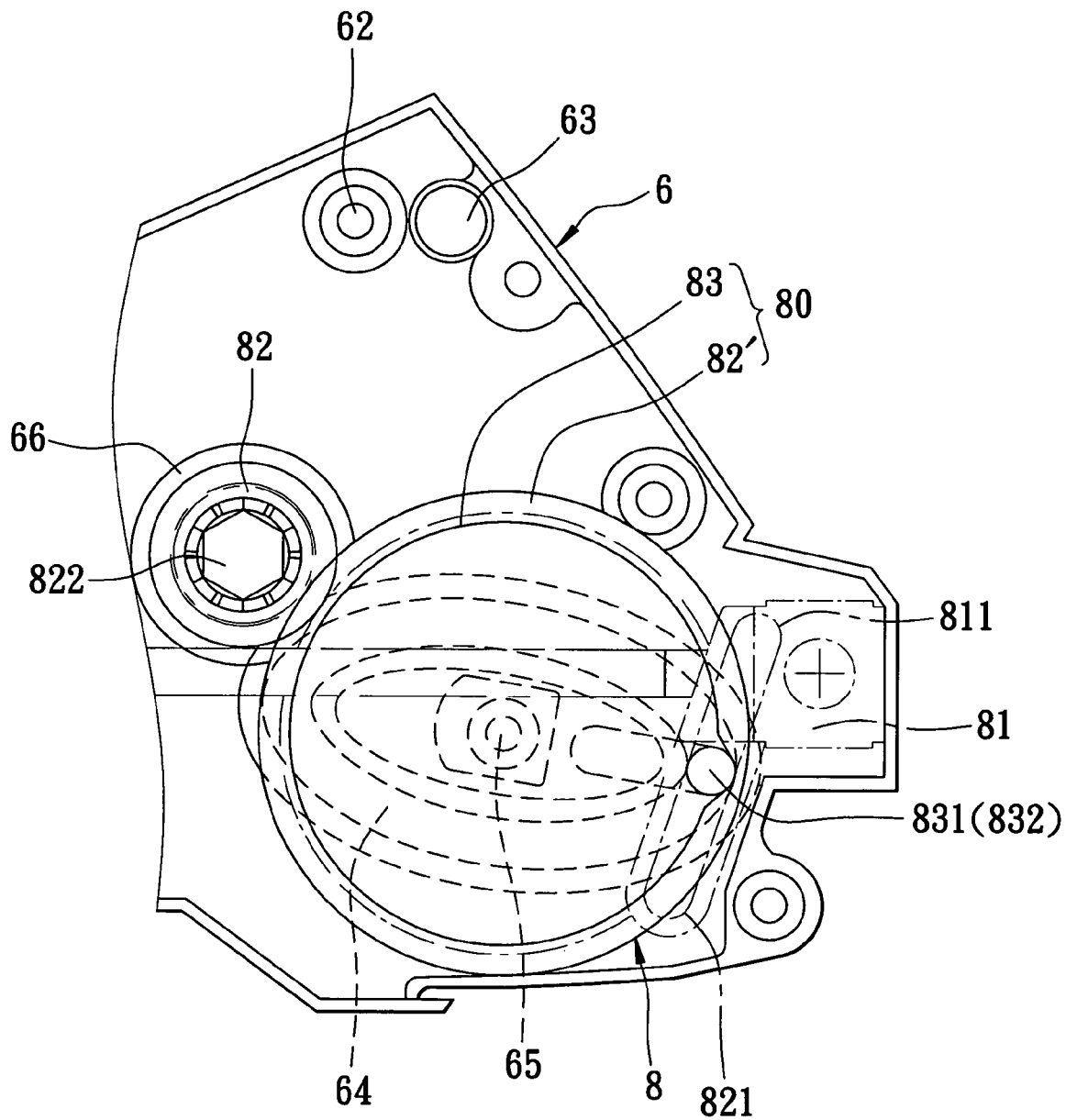
FIG. 4 is a fragmentary side view of a driving unit and one of the side covers of the preferred embodiment.
Figure 7:
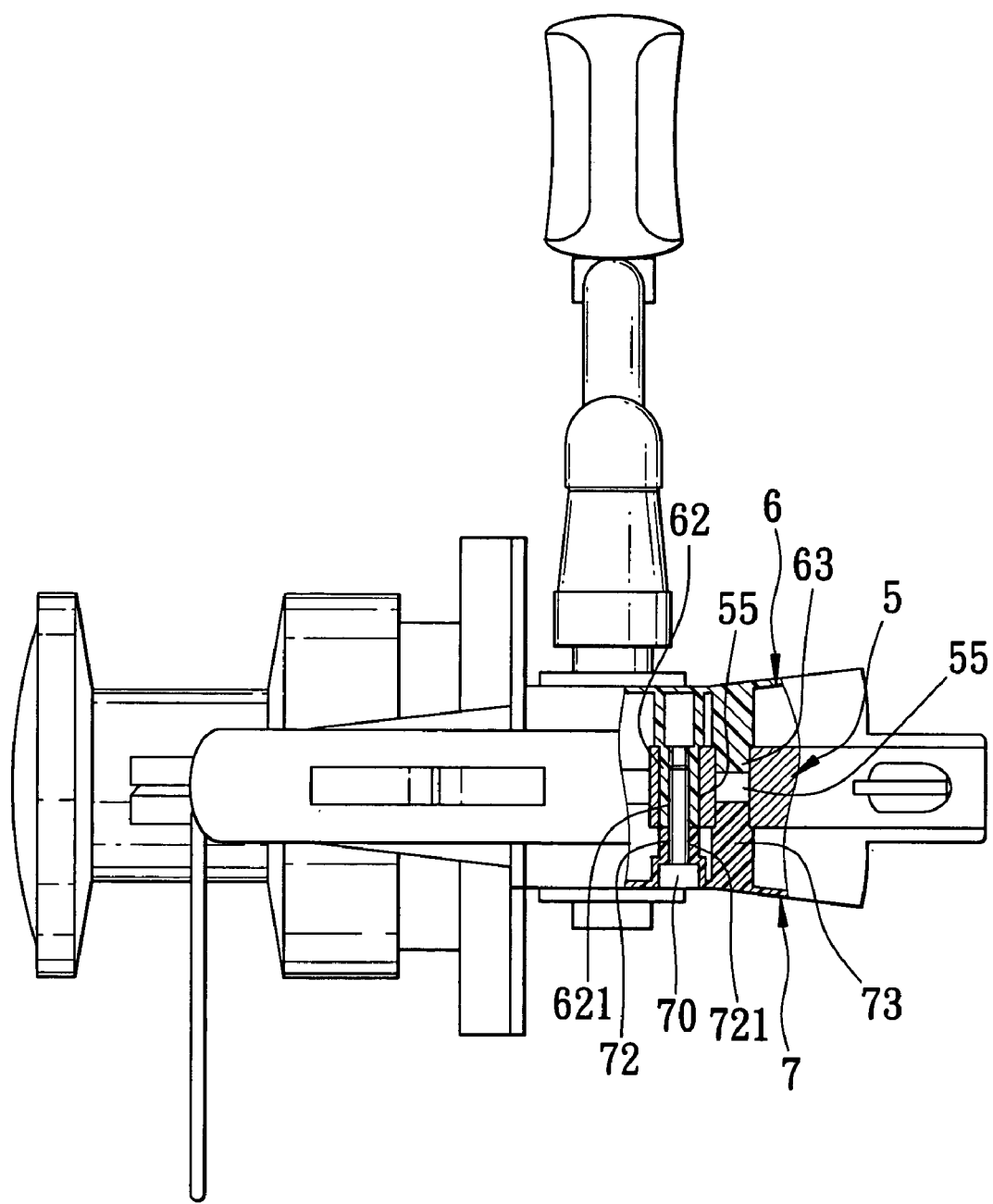
FIG. 7 is a partly sectional top view of the preferred embodiment, illustrating how the side covers are interconnected fixedly by a headed bolt.

Referring to FIGS. 4, 6, and 7, the first and second side covers 6, 7 are made of a lightweight and high-strength plastic material, and are disposed respectively on the opposite sides of the reel body 5 so as to cover the mounting holes 562 in the reel body 5. The first side cover 6 has a bearing hole 61 (see FIG. 6) aligned with the bearing hole 54 in the reel body 5, and a plurality of first positioning rods 62 extending perpendicular to the first axis (X). Each of the first positioning rods 62 has an end surface that is formed with a threaded hole 621. The second side cover 7 has a bearing hole (71) aligned with the bearing hole 54 in the reel body 5, and a plurality of second positioning rods 72 aligned respectively with the first positioning rods 62 of the first side cover 6. Each of the second positioning rods 72 has an axial hole 721 formed therethrough, and an end surface that abuts against the end surface of the corresponding first positioning rod 62 of the first side cover 6. A plurality of headed bolts 70 extend respectively through the axial holes 721 in the second positioning rods 72 of the second side cover 7, and engage respectively the threaded holes 621 in the first positioning rods 62. Therefore, the first and second side covers 6, 7 are interconnected fixedly to clamp the reel body 5 therebetween so as to define an accommodating space 563 (see FIG. 6) among the reel body 5 and the first and second side covers 6, 7. Each of the first and second side covers 6, 7 further has a plurality of insert rods 63, 73, each of which is press fitted within the corresponding positioning hole 55. The first side cover 6 further has an inner surface that is formed with an annular groove 64 and a pivot hole 65. The annular groove 64 is disposed around the pivot hole 65, as shown in FIG. 4.

Figure 5:
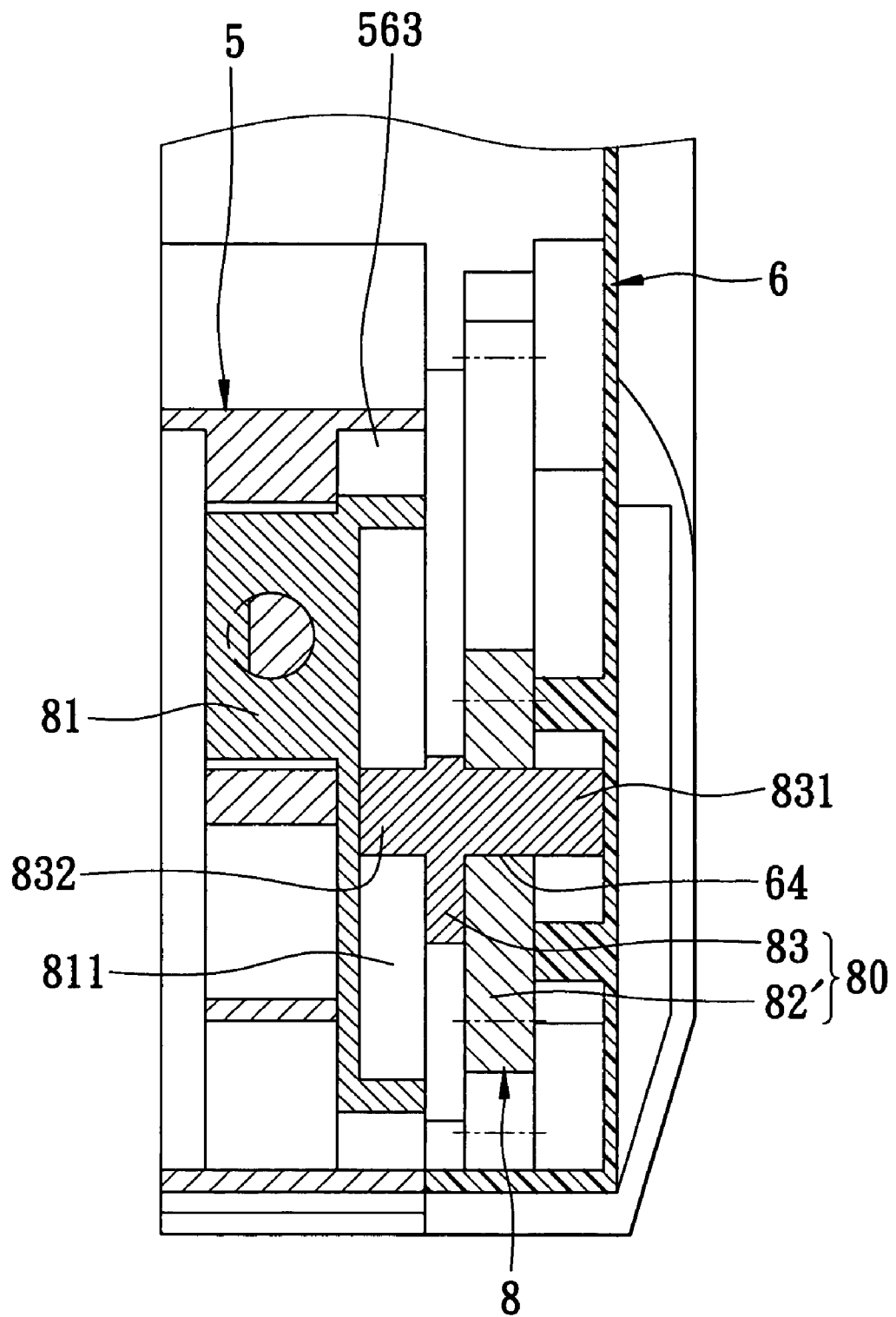
FIG. 5 is a fragmentary sectional view of the preferred embodiment, illustrating the structure of the driving unit.

Referring to FIGS. 4, 5, and 6, the driving unit 8 is disposed within the accommodating space 563 in the reel body 5, and includes a gear unit 80 disposed on the inner surface of the first side cover 6, and a sliding member 81 received slidably within the guide slot 53 in the reel body 5. The gear unit 80 includes a driving gear 82 disposed rotatably within an annular flange 66 (see FIG. 4) on the inner surface of the first side cover 6, a driven gear 82' having a fixed rotating shaft disposed rotatably within the pivot hole 65 in the first side cover 6, and a rotary disk 83. The driven gear 82' meshes with the driving gear 82. The rotary disk 83 is formed with a pair of first and second projections 831, 832, which are received respectively and slidably within slide slots 821, 811 in the driven gear 82' and the sliding member 81 such that rotation of the driven gear 82' can result in reciprocal movement of the sliding member 81 within the guide slot 53 in the reel body 5 along the first axis (X).

Referring to FIG. 3, the spool 9 is disposed movably within the reel body 5, and is connected fixedly to the sliding member 81 so as to allow for synchronous reciprocal movement of the sliding member 81 and the spool 9 within the reel body 5 along the first axis (X).

The rotor 100 is disposed pivotally on the reel body 5, and is rotatable about the spool 9.

Referring to FIGS. 3 and 6, the rotary lever unit 140 includes a shaft tube 141, a gear-engaging sleeve 142, a gear 143, and a rotary lever 144. The shaft tube 141 extends through the bearing holes 54, 61, 71 in the reel body 5 and the first and second side covers 6, 7. The gear-engaging sleeve 142 is sleeved fixedly on the shaft tube 141, and engages fittingly a hexagonal hole 822 (see FIG. 4) in the driving gear 82 so as to allow for synchronous rotation of the driving gear 82 and the shaft tube 141. Thus, rotation of the rotary lever unit 140 can be transferred to the driven gear 82' so as to move the sliding member 81 and the spool 9 within the reel body 5. The gear 143 is formed integrally with the shaft tube 141, and meshes with a gear 101 (see FIG. 3) of the rotor 100 so as to transfer rotation of the rotary lever unit 140 to the rotor 100.

Because the first and second side covers 6, 7 are made of the plastic material, and because the mounting holes 562 are formed through the reel body 5, the total weight of the fishing spinning reel of this invention can be reduced significantly.

With this invention thus explained, it is apparent that numerous modifications and variations can be made without departing from the scope and spirit of this invention. It is therefore intended that this invention be limited only as indicated by the appended claims.

I claim:

1. A fishing spinning reel comprising:
   a flat reel body made of metal and having two opposite sides, a fishing rod attaching portion, and a plurality of mounting holes that are formed through said reel body, each of said mounting holes having two open ends at the opposite sides of said reel body;
   wherein said reel body has a peripheral frame portion formed integrally with said fishing rod attaching portion, and two parallel guide rods extending integrally from said peripheral frame portion so as to define a guide slot therebetween, said sliding member being received slidably within said guide slot;
   two side covers made of a plastic material and disposed respectively on the opposite sides of said reel body so as to cover said mounting holes in said reel body, said side covers being interconnected to clamp said reel body therebetween so as to define an accommodating space among said reel body and said side covers;
   a driving unit disposed within said accommodating space and including a sliding member disposed movably within said reel body;
   a spool shaft disposed movably within said reel body and connected to said sliding member so as to allow for synchronous reciprocal movement of said sliding member and said spool shaft within said reel body along an axis;
   a rotor disposed pivotally on said reel body and rotatable about said spool shaft; and
   a rotary lever unit disposed pivotally on said reel body and connected operatively to said driving unit, said rotary lever unit being operable to cause reciprocal movement of said sliding member of said driving unit and said spool shaft within said reel body and rotation of said rotor on said reel body.

2. The fishing spinning reel as claimed in claim 1, wherein one of said side covers is formed with a first positioning rod that extends along a direction perpendicular to said axis and that has an end surface which is formed with a threaded hole, the other of said side covers being formed with a second positioning rod that is aligned with said first positioning rod and that has an axial hole formed therethrough, and an end surface that abuts against said end surface of said first positioning rod, said fishing spinning reel further including a headed bolt that extends through said axial hole in said second positioning rod and that engages said threaded hole in said first positioning rod so as to interconnect said side covers fixedly.

3. A fishing spinning reel comprising:
   a flat reel body made of metal and having two opposite sides, a fishing rod attaching portion, and a plurality of mounting holes that are formed through said reel body, each of said mounting holes having two open ends at the opposite sides of said reel body;
   two side covers made of a plastic material and disposed respectively on the opposite sides of said reel body so as to cover said mounting holes in said reel body, said side covers being interconnected to clamp said reel body therebetween so as to define an accommodating space among said reel body and said side covers;
   a driving unit disposed within said accommodating space and including a sliding member disposed movably within said reel body;
   a spool shaft disposed movably within said reel body and connected to said sliding member so as to allow for synchronous reciprocal movement of said sliding member and said spool shaft within said reel body along an axis;
   a rotor disposed pivotally on said reel body and rotatable about said spool shaft; and
   a rotary lever unit disposed pivotally on said reel body and connected operatively to said driving unit, said rotary lever unit being operable to cause reciprocal movement of said sliding member of said driving unit and said spool shaft within said reel body and rotation of said rotor on said reel body, wherein one of said side covers has an inner surface that is formed with an annular groove, said driving unit further including a gear unit, said gear unit including a driven gear that is rotated by said rotary lever unit, and a rotary disk that is formed with first and second projections which are connected respectively to said driven gear and said sliding member of said driving unit such that rotation of said driven gear can result in reciprocal movement of said sliding member within said reel body.

4. The fishing spinning reel as claimed in claim 3, wherein said driven gear is formed with a slide slot, said first projection of said rotary disk being received slidably within said slide slot in said driven gear.

5. The fishing spinning reel as claimed in claim 3, wherein said sliding member is formed with a slide slot, said second projection of said rotary disk being received slidably within said slide slot in said sliding member.

* * * * *